Aug. 18, 1959 S. I. RAMBO 2,900,576
ELECTRONIC TUBE CONTROL CIRCUIT
Filed March 14, 1955
Fig. 1.
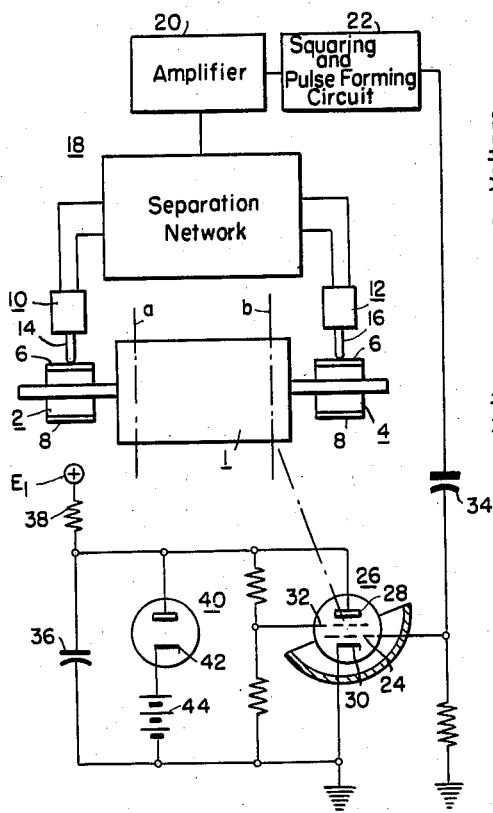
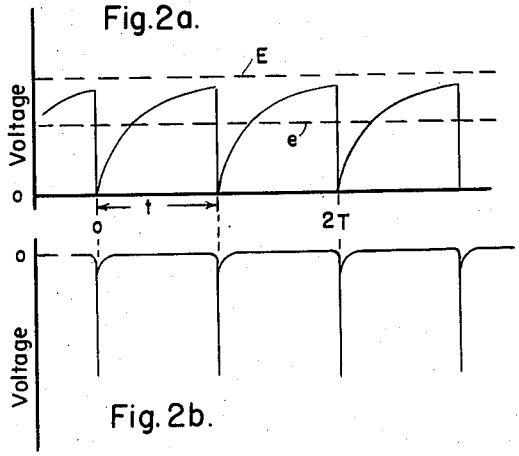
Fig. 2a.
Fig. 2b.
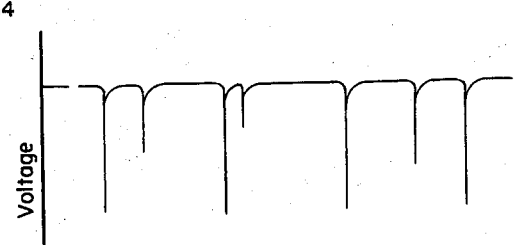
Fig. 3.
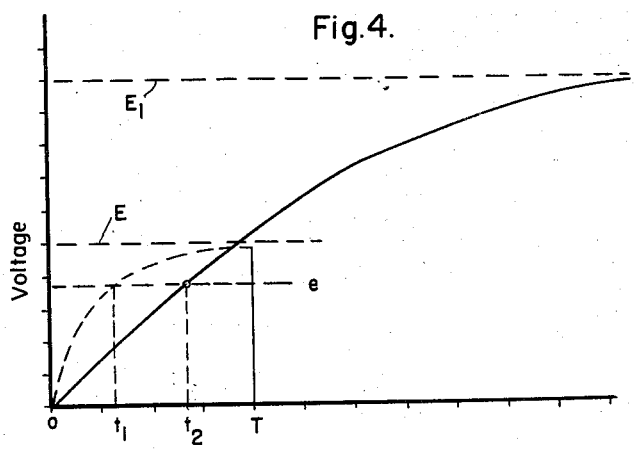
Fig. 4.
WITNESSES:
E. A. M?Closky.
E. F. Oberheim.
INVENTOR
Sheldon I. Rambo.
BY
Paul E. Friedemann
ATTORNEY United States Patent Office 2,900,576
Patented Aug. 18, 1959

2,900,576

ELECTRONIC TUBE CONTROL CIRCUIT

Sheldon I. Rambo, Baltimore, Md., assignor to Westinghouse Electric Corporation, East Pittsburgh, Pa., a corporation of Pennsylvania Application March 14, 1955, Serial No. 494,011

4 Claims. (Cl. 315—241)

This invention relates generally to circuit arrangements for controlling electronic tubes and, more particularly, to a circuit for controlling the firing of a stroboscopic type of tube.

Stroboscopic tubes are frequently employed in balancing machine arrangements for illuminating a rotating workpiece, which is being balanced, in synchronism with the rotation cycle. When so employed, the firing of the stroboscopic tube is controlled by electrical impulses applied to its grid. These electrical impulses are derived from the output of an electrical pickup which is mounted with respect to the balancing machine to respond to vibratory movement of the rotating workpiece. As a result of the physical arrangement of the electrical pickup with respect to the balancing machine and of the circuitry which is associated with and responsive to the output of the electrical pickup, the electrical impulses which are applied to the grid of the stroboscopic tube, in the ideal case, are produced in synchronism with running frequency and in the ideal situation cause the tube to be fired in synchronism with the rotation of the workpiece so that a particular spot on the rotating workpiece will be illuminated once each revolution to indicate the actual angular position of unbalance in the workpiece.

However, as will be described more particularly hereinafter, difficulties arise in connection with the production of the grid controlling electrical impulses, due primarily to physical conditions involving the balancing machine apparatus, which results in extraneous pulses spaced between the main pulses and of such magnitude as to cause firing of the stroboscopic tube at random points. Such random illumination of the workpiece makes the determination of the precise angle of unbalance in the workpiece extremely difficult and, if the condition is serious enough, may even render the balancing machine useless in determining the angle of unbalance by this means.

Accordingly, one object of this invention is to provide a control arrangement for a stroboscopic tube which will minimize the possibilities of random firing of a stroboscopic tube.

More specifically stated, it is an object of this invention to cyclically control the plate voltage of a stroboscopic tube so as to minimize the possibility of random firing of the tube excepting approximately at the end of respective time intervals or periods.

A specific object of this invention is to provide a balancing machine arrangement embodying a stroboscopic tube for illuminating the workpiece in which the determination of the angle of unbalance is facilitated.

The foregoing statements are merely illustrative of the various aims and objects of this invention. Other objects and advantages will become apparent from a study of the following specification when considered in conjunction with the accompanying drawings in which:

Figure 1 is a diagrammatic illustration of a balancing machine system embodying the principles of this invention;

Fig. 2a illustrates a conventional plate voltage characteristic of a stroboscopic tube and Fig. 2b illustrates an ideal grid voltage pulse characteristic having a time base corresponding to the time base of the plate voltage characteristic of the stroboscopic tube;

Fig. 3 illustrates a typical practical grid voltage pulse characteristic which is usually obtained from the electrical pickup systems of balancing machines showing the spurious pulse components between the main cyclic voltage pulses intended to fire the stroboscopic tube; and Fig. 4 graphically relates the stroboscopic tube anode voltage characteristic of this invention to the conventional characteristic of the type shown in Fig. 2a.

Referring to the drawings, and particularly to Fig. 1, the workpiece 1 which is to be balanced is journalled in respective bearings 2 and 4. In one practical embodiment, these bearings are mounted at the upper end of respective flat leaf springs 6 and 8. A top view of the arrangement is herein illustrated so only the upper edges of the flat leaf springs are illustrated. These springs are arranged in parallel relationship and their bases are secured in suitable supports (not shown) on the bed of the balancing machine. Details of this resilient bearing support are not illustrated in the interest of simplicity since per se such supports form no part of the present invention. However, reference may be had to U.S. Patent 2,165,024 to J. G. Baker et al. for details of such bearing supports.

The balancing machine system herein described is generally known as a two plane balancing arrangement in which the bearings each provide a single degree of freedom for the opposite ends of the rotor. In this particular instance this single degree of freedom is in a horizontal plane and the correction planes in which weight is to be added or removed from the rotor are indicated by the dot-dash lines (a) and (b) which are disposed in axially displaced positions along the rotor.

Vibratory movement of the respective ends of the rotor or workpiece 1 which is to be balanced is detected by respective electrical pickup devices 10 and 12 provided with prods 14 and 16 which engage the respective bearings. Any suitable type of electrical pickup device may be employed. One type known as the electrodynamic type of pickup having a moving coil driven across a magnetic field by the vibratory movement of the associated bearing and producing a voltage proportional to the velocity of the movement is illustrated in the aforesaid patent to J. G. Baker et al. Other suitable types include crystal pickups, magnetostrictive pickups, resistance pickups, capacitive pickups, and photoelectric pickups, all of which are well known in the art and require no further consideration in this application.

The output of each pickup is applied to a plane separation network, generally designated 18, in which the pickup voltages are suitably mixed. The purpose of mixing these voltages is to obtain an indication of vibratory movement at one end of the rotor which is compensated for the effect of the unbalance disturbance in the other correction plane. In other words and by way of example, mixing of the signals limits the output voltage of the plane separation network with respect to pickup 10 due only to the effect of mass unbalance with respect to the associated correction plane (a) and eliminates the effect of unbalance with respect to correction plane (b) in the output voltage of the plane separation network. The system details whereby such unbalance signal isolation is achieved are also particularly described in the aforesaid patent to J. G. Baker et al.

For an electrodynamic type of pickup, in the ideal case, the output of the plane separation network is a sinusoidal voltage of a frequency corresponding to running frequency of the workpiece. This voltage is amplified and applied to a squaring and pulse forming circuit 22 which may comprise a conventional clipper-limiter input stage, which squares the incoming sinusoidal voltage, and a derivative type output circuit to the input of which the square wave output voltage of the squarer stage is applied. The output voltage of this squaring and pulse forming circuit 22 is therefore a series of pulses synchronized with the running frequency of the rotating workpiece.

The output voltage of the pulse forming circuit 22 is applied to the grid 24 of a stroboscopic tube, for example, such as a 1D21, generally designated 26, which is physically arranged to illuminate the workpiece 1 each time it flashes. This tube conventionally comprises an anode 28, a cathode 30 and a screen grid 32 in addition to the control grid 24. A capacitor 34 is used to couple the output of the pulse forming circuit 22 to the control grid 24.

Referring now to Figs. 2a and 2b, certain of the problems relating to the control of stroboscopic tube 26 are discussed. For prior art arrangements, the anode voltage characteristics of the stroboscopic tube are illustrated in Fig. 2a. In such conventional arrangements a source of supply voltage having a voltage magnitude E, which is a little greater than the operating voltage of the stroboscopic tube, is connected through a resistor-capacitor circuit to the anode and cathode of the stroboscopic tube. The time constant of this R-C circuit is selected so that in a given time interval $t$, corresponding to the time interval or period between the grid voltage pulses as shown in Fig. 2b, the capacitor controlling the anode voltage of the stroboscopic tube will have charged substantially to the voltage E of the source. Stroboscopic tubes have a minimum anode voltage represented by the broken line $e$ in Fig. 2a at which the tube may break down and fire upon the application of a suitable grid voltage. As will be seen by reference to Fig. 2a, the capacitor charges to this voltage $e$ at about ⅓ of the time interval $t$ so that the occurrence of a grid pulse at any time in the remaining portion of the time interval $t$ will cause firing of the stroboscopic tube. Under ideal conditions of grid pulse generation, as represented by the grid pulse configuration of Fig. 2b, firing may not occur excepting at the end of each time interval $t$ due to the absence of extraneous grid pulses. However, in actual practice it has been found that the ideal grid pulse of Fig. 2b is not easily obtained, if obtainable at all, and the grid pulse characteristic is usually of a configuration exemplified by the characteristic of Fig. 3 in which extraneous pulses appear between the main pulses.

Such random pulse production has been found to be primarily the result of extraneous bearing vibration resulting from floor or building vibration, bearing roughness and stray pickup of power line energy. These unwanted vibrations and pickups usually contain high frequency components which modulate the sine wave voltage characteristics of the pickups and frequently result in instantaneous voltage magnitudes at points on the voltage cycle displaced from the points of maximum amplitude of the pure sine wave voltage. In view of the difficulties encountered with attempts to filter this high frequency "hash" from the pickup voltage, these unwanted voltage characteristics usually appear in the output pulse voltage characteristic. Consequently, the flashing of the stroboscopic tube may be completely unreliable with respect to the actual position of angular unbalance of the workpiece 1.

The circuit arrangement for controlling the anode voltage of the stroboscopic tube illustrated in Fig. 1 minimizes random firing of the stroboscopic tube due to these extraneous pulses in the grid voltage characteristic. In this arrangement a source of voltage E1 represented between the point of positive potential (+) and ground is selected of a magnitude which is considerably larger than the normal operating anode voltage of the stroboscopic tube 26. This, it will be appreciated, differs from the consideration relating to Fig. 2a in which the source voltage E therein discussed is of a magnitude corresponding approximately to the normal operating voltage of the stroboscopic tube as described. The source voltage E1 is connected to the anode and cathode of the stroboscopic tube by means of a capacitor 36, the charging rate of which is controlled by a resistor 38 connected in series therewith across the source voltage E1. The time constant of this resistor-capacitor circuit is selected so that the capacitor will charge to the normal operating anode voltage of the stroboscopic tube 26 in the time interval $t$ which represents the time interval between respective grid voltage pulses.

The charging characteristic of this resistor-capacitor circuit is represented by the solid curve in Fig. 4 which illustrates the relatively long period of time required for the capacitor to charge substantially to the full voltage of the source E1. This characteristic is compared with the conventional characteristic which is illustrated by the broken curved line. By comparing these characteristics it will be noted that with the conventional arrangement, in which the source voltage E corresponds approximately to the normal operating anode voltage of the stroboscopic tube, the capacitor is charged to the minimum anode voltage of the stroboscopic tube in a time interval $t1$ which is approximately ⅓ of the total time interval between pulses T. By increasing the time constant of the resistor-capacitor anode circuit of the stroboscopic tube and by increasing the source voltage to a value E1, which may be approximately double the normal operating anode voltage, for example, for the purpose of this discussion only, it will be seen that the charging characteristic of the capacitor is flattened considerably over the range between zero capacitor voltage and a voltage corresponding to normal operating anode voltage of the stroboscopic tube. This flattening of the charging characteristic of the capacitor delays the build-up of anode voltage for an interval represented by time interval $t2$ which it will be noted in Fig. 4 represents approximately ⅔ of the time interval T. In the conventional arrangement the chances are approximately two out of three that an extraneous pulse may fire the stroboscopic lamp. With the new arrangement, however, the chances are only one in three that an extraneous pulse will fire the stroboscopic tube.

To prevent any possibility of the anode voltage, due to the charge on capacitor 36, from rising above the normal operating anode voltage of the tube, a cathode biased diode 40 is connected across the capacitor 36. The cathode 42 of diode 40 is shown connected to the positive terminal of a battery 44, the voltage of which may correspond approximately to the normal operating anode voltage of the stroboscopic tube. With this arrangement and by poling the diode to conduct capacitor discharge current, the diode is effectively maintained at cut-off until the capacitor voltage exceeds the voltage of battery 44. When this occurs the diode conducts and discharges the capacitor thereby maintaining the capacitor voltage at a voltage level corresponding to normal anode voltage for the strobocopic tube. While a battery 44 has been illustrated in this arrangement, it will be appreciated that any suitable source of unidirectional voltage may be utilized in place of the battery to negatively bias the diode 40.

From the foregoing considerations it will be appreciated that the circuitry herein illustrated and described provides a novel approach to a solution of the problem of preventing or at least minimizing random firing of the stroboscopic tube. At the same time this is accomplished with a minimum of additional equipment and with equipment which is simple and requires little or at least no more maintenance than the average components of a system of this type require. As a consequence, this invention while effectively alleviating a serious problem in balancing machine arrangements accomplishes this end with a minimum of additional manufacturing costs and operational problems.

Although but one embodiment of this invention has been herein illustrated, it will be appreciated by those skilled in the art that this invention, both as to its details and as to the organization of these details, may be practiced in modified form without departing from the spirit and scope of the invention. Accordingly, it is intended that the foregoing disclosure and illusrations in the drawings shall be considered only as illustrative of the principles of this invention and not interpreted in a limiting sense.

I claim as my invention:

1. Stroboscopic tube apparatus comprising, a stroboscopic tube having an anode, a cathode and a grid, circuit means for producing cyclic voltage pulses connected to said grid to trigger said tube and cause tube conduction, said tube being selected to have a minimum anode voltage at which tube conduction may occur and to have a normal higher operating anode voltage, an energizing circuit for the anode and cathode and including a resistor and a capacitor connected in series, the voltage of said energizing circuit being selected to be approximately double said normal operating voltage for said anode, the time constant of said resistor and capacitor being so selected as to delay charging of said capacitor to said energizing circuit voltage an interval of time substantially longer than the time interval between grid voltage pulses and thus flattening the voltage versus time characteristic of said capacitor voltage during the grid voltage pulse time interval, whereby the capacitor voltage rise to said minimum anode voltage is delayed for substantially two-thirds of the grid voltage pulse time interval, the anode and cathode being connected across the capacitor, and a voltage biased rectifier also connected across said capacitor and connected to conduct capacitor discharge current whenever the voltage of said capacitor reaches said normal operating voltage.

2. Stroboscopic tube apparatus comprising, a stroboscopic tube having an anode, a cathode and a grid, circuit means for producing cyclic voltage pulses connected to said grid to trigger said tube and cause tube conduction, said tube being selected to have a minimum anode voltage at which tube conduction may occur and to have a normal higher operating anode voltage, an energizing circuit for the anode and cathode and including a resistor and a capacitor connected in series, the voltage of said energizing circuit being selected to be approximately double said normal operating voltage for said anode, the resistance value of the resistor and capacity of the capacitor being so selected in relation to the voltage of the energizing circuit that the time constant of said resistor and capacitor is such as to delay charging of said capacitor to said energizing circuit voltage an interval of time substantially longer than the time interval between grid voltage pulses and thus flattening the voltage versus time characteristic of said capacitor voltage during the grid voltage pulse time interval whereby the capacitor voltage rise to said minimum anode voltage is delayed for substantially two-thirds of the grid voltage pulse time interval, said anode and cathode being connected across the capacitor, a rectifier, a source of bias voltage of a magnitude corresponding to the magnitude of said normal operating voltage, and circuit means connecting said rectifier and said source of bias voltage in series across said capacitor with said rectifier poled to conduct capacitor discharge current when the voltage of said capacitor exceeds said bias voltage.

3. Apparatus for detecting unbalance in a resiliently mounted rotatable body comprising, electrical pickup means disposed to respond to vibratory movement of said body and producing an alternating current voltage having a frequency corresponding to running frequency of said rotatable body and having stray frequency components due to stray vibration pickup of said electrical pickup, a pulse voltage forming circuit responsive to said electrical pickup voltage, said pulse voltage having a main period corresponding to running frequency of said rotatable body and having spurious pulses between the running frequency pulses resulting from said stray frequency components, a stroboscopic tube for illuminating said rotatable body and having an anode, a cathode and a control grid, said stroboscopic tube being selected to have a normal operating anode-cathode voltage and a minimum anode-cathode voltage at which tube conduction may occur, a pair of energized terminals, a capacitor and an impedance connected in series across said terminals, said capacitor being connected across said anode and said cathode, said terminals having a voltage supply of substantially greater magnitude than said normal operating voltage of said stroboscopic tube, the impedance value of said impedance and the capacitance of said capacitor being of such magnitudes to delay charging of said capacitor to said minimum anode-cathode voltage until approximately two-thirds of said main voltage pulse period has elapsed, a negatively biased polarized circuit connected across said capacitor and having a negative bias level corresponding at least to said normal operating voltage of said stroboscopic tube and poled to conduct capacitor discharge current when capacitor voltage exceeds said negative bias, and circuit means connecting said pulse voltage forming circuit to said grid of said stroboscopic tube to initiate firing of said tube.

4. Apparatus for detecting unbalance in a resiliently mounted rotatable body comprising, electrical pickup means disposed to respond to vibratory movement of said body and producing an alternating current voltage having a frequency corresponding to running frequency of said rotatable body and having stray frequency components due to stray vibration pickup of said electrical pickup, a pulse voltage forming circuit responsive to said electrical pickup voltage, said pulse voltage having a main period corresponding to running frequency of said rotatable body and having spurious pulses between the running frequency pulses resulting from said stray frequency components, a stroboscopic tube for illuminating said rotatable body and having an anode, a cathode and a control grid, said stroboscopic tube being selected to have a normal operating anode-cathode voltage and a minimum anode-cathode voltage at which tube conduction may occur, an energizing circuit for said tube said circuit including a pair of terminals energized at a voltage substantially greater in magnitude than said normal operating voltage of said stroboscopic tube and a capacitor and an impedance connected in series across said terminals, said capacitor being connected across said anode and said cathode, said impedance and said capacitor having such magnitudes of resistance and capacitance to delay charging of said capacitor to said minimum anode-cathode voltage until approximately two-thirds of said main voltage pulse period has elapsed, a negatively biased rectifier connected across said capacitor and poled to conduct capacitor discharge current when said capacitor voltage exceeds said negative bias, said negative bias having a magnitude corresponding to said normal operating voltage of said stroboscopic tube, and circuit means connecting said pulse voltage forming circuit to said grid of said stroboscopic tube to initiate firing of said tube.

References Cited in the file of this patent

UNITED STATES PATENTS

| | | |
|---|---|---|
| 2,043,484 | Miller | June 9, 1936 |
| 2,181,879 | Edgerton | Dec. 5, 1939 |
| 2,421,182 | Bayne | May 27, 1947 |
| 2,478,905 | Edgerton | Aug. 16, 1949 |
| 2,538,577 | McCarty | Jan. 16, 1951 |
| 2,721,959 | Nessel | Oct. 25, 1955 |